United States Patent
Witt et al.

[11] 3,732,468
[45] May 8, 1973

[54] TIMING DEVICE FOR COOKING MEAT

[75] Inventors: Allan E. Witt, Westport; George M. Suhm, Bridgeport, both of Conn.

[73] Assignee: Food Automation-Service Techniques, Inc., Bridgeport, Conn.

[22] Filed: Feb. 16, 1972

[21] Appl. No.: 226,741

Related U.S. Application Data

[63] Continuation-in-part of Ser. No. 111,426, Feb. 1, 1971, abandoned.

[52] U.S. Cl. .................307/149, 99/344, 317/141 S
[51] Int. Cl. ..........................................G07c 1/02
[58] Field of Search.............................99/342, 344; 317/148.5 B, 141 S; 307/149

[56] References Cited

UNITED STATES PATENTS

| | | | |
|---|---|---|---|
| 3,106,667 | 10/1963 | Winchel | 317/141 S |
| 3,582,716 | 6/1971 | Traina | 317/148.5 B |

*Primary Examiner*—L. T. Hix
*Assistant Examiner*—Harry E. Moose, Jr.
*Attorney*—Roland T. Bryan et al.

[57] ABSTRACT

An alarm type timing device is provided for use in cooking meat. The device includes a non-linear, electronic circuit adapted to approximate the unusual nature of outdoor charcoal-grill type of cookery. The circuit is so designed as to act as a mathematical model for the meat being cooked and, using empirical data, takes into consideration the nature of the bed of charcoal, the desired "doneness", and the thickness of the meat, and thereby provides an alarm signal when the cooking is completed.

7 Claims, 13 Drawing Figures

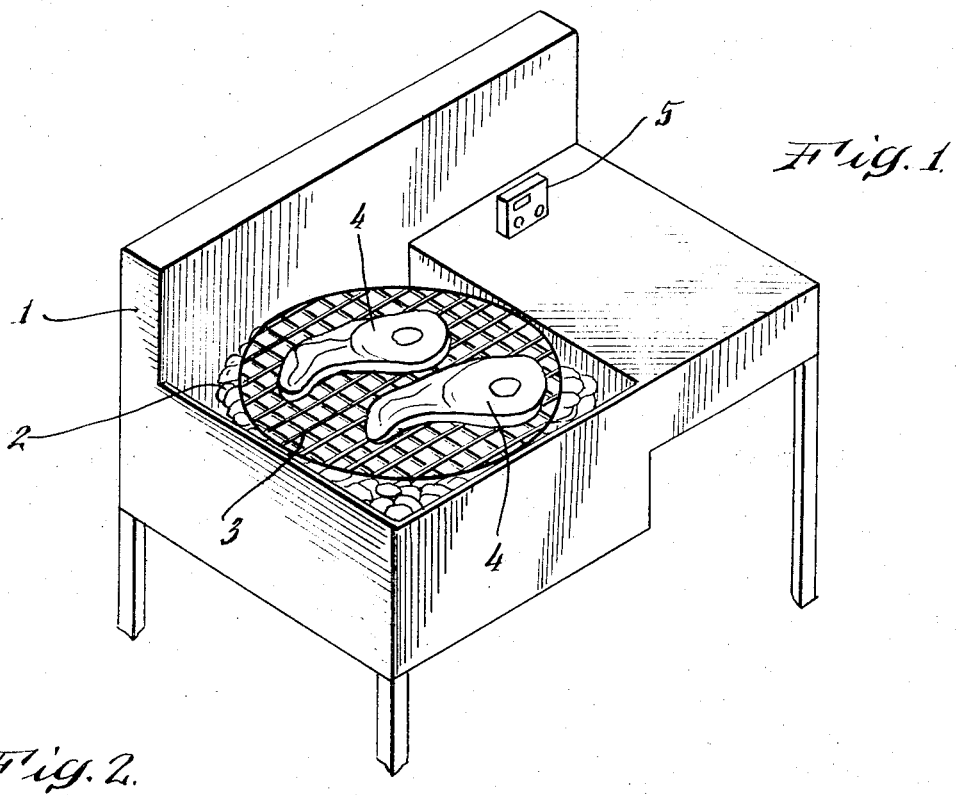
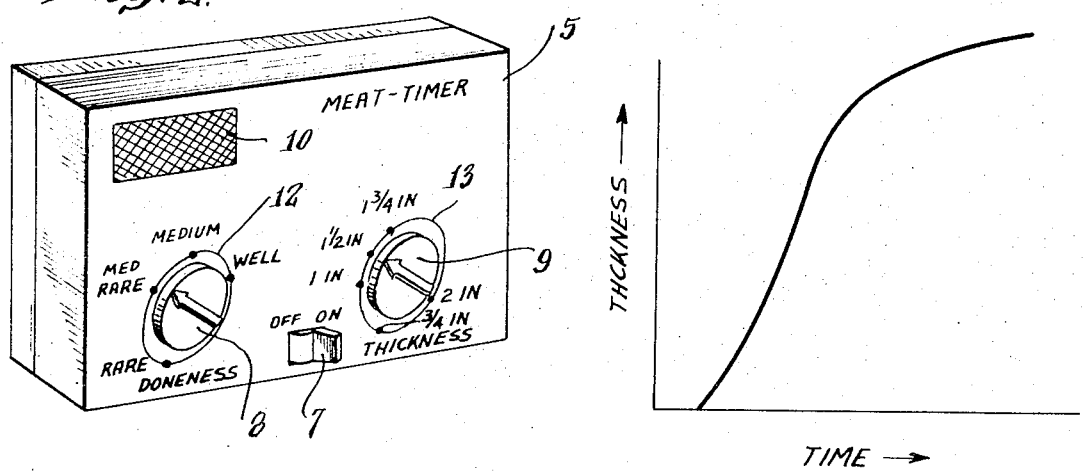
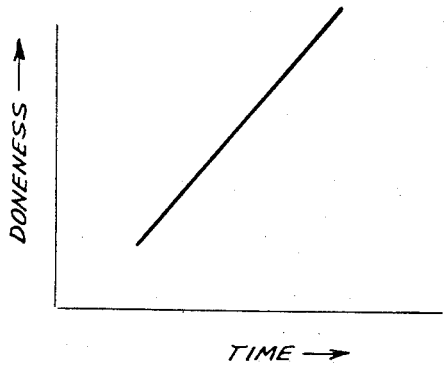

TIMING DEVICE FOR COOKING MEAT

This application is a continuation-in-part of application Ser. No. 111,426, filed Feb. 1, 1971, entitled "Timing Circuit for a Timer Alarm," now abandoned.

BACKGROUND

Meat cooking timers, such as timers used for outdoor cookery of steak over charcoal, normally are simple clock-type timers which can be set to give an alarm at the end of a predetermined time. Some meat timers, on the other hand, utilize a probe inserted in the meat to measure internal temperatures and so determined degree of cooking. Neither technique is too useful, however, when the cooking is done over a charcoal grill.

The inventors have found that the time that it takes a steak to cook over charcoal, for a given degree of doneness, such as rare or well done, does not relate directly to the thickness of the steak. That is, it has been found that if one steak is, say, 50 percent thicker than an another one, the thicker steak will have to be cooked more than 50 percent longer than the thinner one in order to obtain the same degree of doneness. As a result, one cannot determine the desired length of time for a given degree of doneness by measuring the thickness of the steak.

The above information has been determined empirically. The theoretical reason why this is true is not known, but it may be that the steaks receive the heat from the fire and re-radiate it. This re-radiation increases when the outer surfaces get hotter, and the result is that the cooking time goes up at a very fast rate as steaks get thicker.

By way of illustration, a 1 ½ inch steak might take 6 minutes to reach a desired degree of doneness; but a 2 inch steak would take twice that long to reach the same degree of doneness, even though the 2 inch steak is only a third thicker and one would assume should take a third more time. This means that the cooking time for a steak rises rapidly as the steak gets thicker, and cooking time cannot be calculated on a linear basis.

This application is a continuation-in-part application of application Ser. No. 111,426, filed Feb. 1, 1971.

SUMMARY OF THE INVENTION

We have discovered that meat cooked over an outdoor grill, such as a broiled steak, has unusual characteristics relating to its cooking times. Three factors are of prime consideration in determining the cooking time:

a. the quantity of hot coals and their distance from the meat;

b. the degree of doneness of the meat desired, such as medium rare; and c. the thickness of the neat.

Normally most people regularly use the same grill and substantially the same number of coals, so that the first factor is standardized. The extent of cooking of a given piece of meat may vary, however, from time to time in accordance with the particular person's desires. And, of course, the thickness often varies.

Under these circumstances we have found that a standardized base time of cooking is required, together with a variable time which depends upon the thickness of the meat and the desired degree of doneness. The variable time requires introduction of non-linearity into the timer's controls. We have done this in such a manner as to match the characteristics of the meat.

We have provided a timing circuit which, when turned on, provides a base time period plus an additional time period which relates to the degree of doneness desired and the thickness of the meat. The unit uses the charging curve of a capacitor to determine the time cycle and varies the rate of charging in accordance with the above factors. When the capacitor is fully charged it opens a first gate, preferably a unijunction transistor for precise control of tolerances, which in turn fires an SCR. The SCR can control a suitable alarm system such as a light or oscillatory circuit.

THE DRAWINGS

FIG. 1 is a perspective view showing a typical outdoor grill with hot coals being used to cook some steaks.

FIG. 2 is a perspective view of the timing device of our invention.

FIG. 3 is a typical curve showing cooking time variations with thickness of steak, to exemplify part of our discovery.

FIG. 4 is a typical curve showing degree of doneness versus cooking time.

FIGS. 5, 6, 7 and 8 show the results as we varied the thickness of the steak and determined how long we would have to cook it. They show the cooking times for rare, medium rare, medium and well done, respectively. The shaded area shows the general range of cooking times, while the dotted line in the curves shows the degree to which our device has been able to approximate those times.

FIGS. 9, 10, 11 and 12 show the degree of doneness varies with time. These are for steaks that are ¾ inch, 1 inch, 1 ½ inch and 2 inch thick, respectively. As with the earlier figures, the shaded area indicates the range of cooking times as determined empirically, and the dotted line shows the actual times produced by our device for the settings in question.

Figure 5:
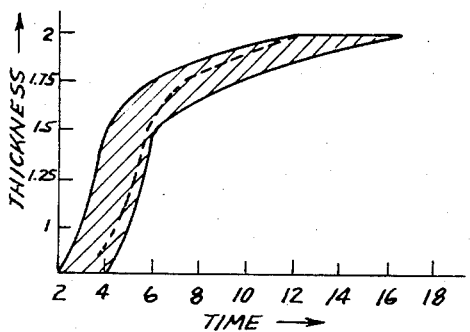
Figure 6:
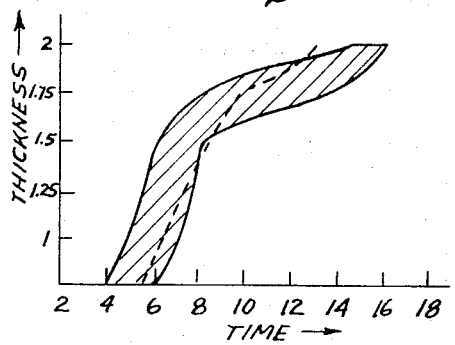
Figure 7:
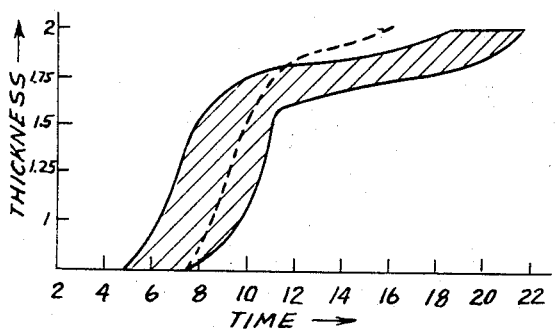
Figure 8:
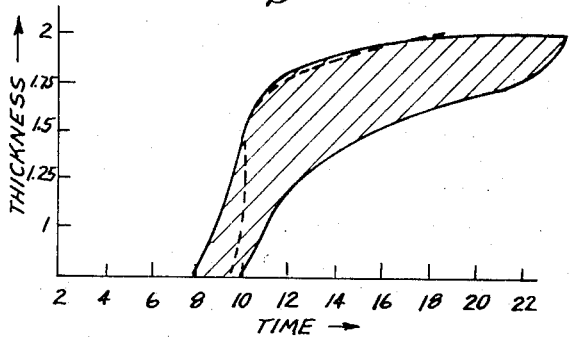
Figure 9:
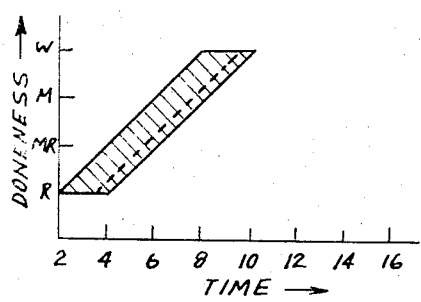
Figure 10:
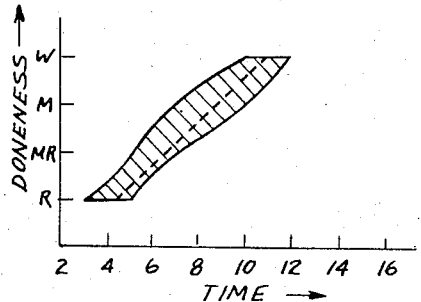
Figure 11:
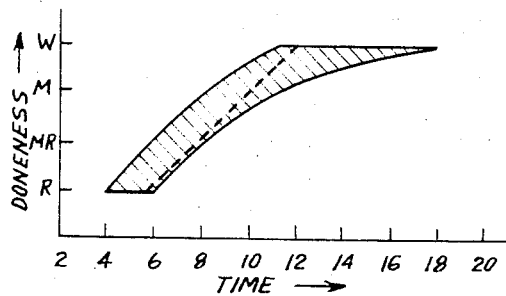
Figure 12:
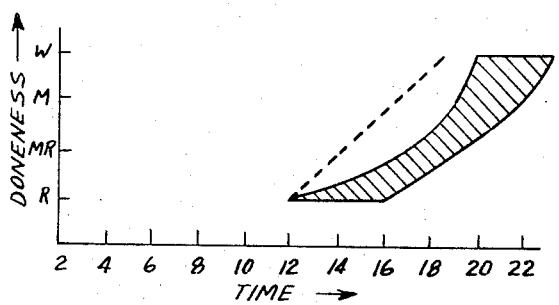
Figure 13:
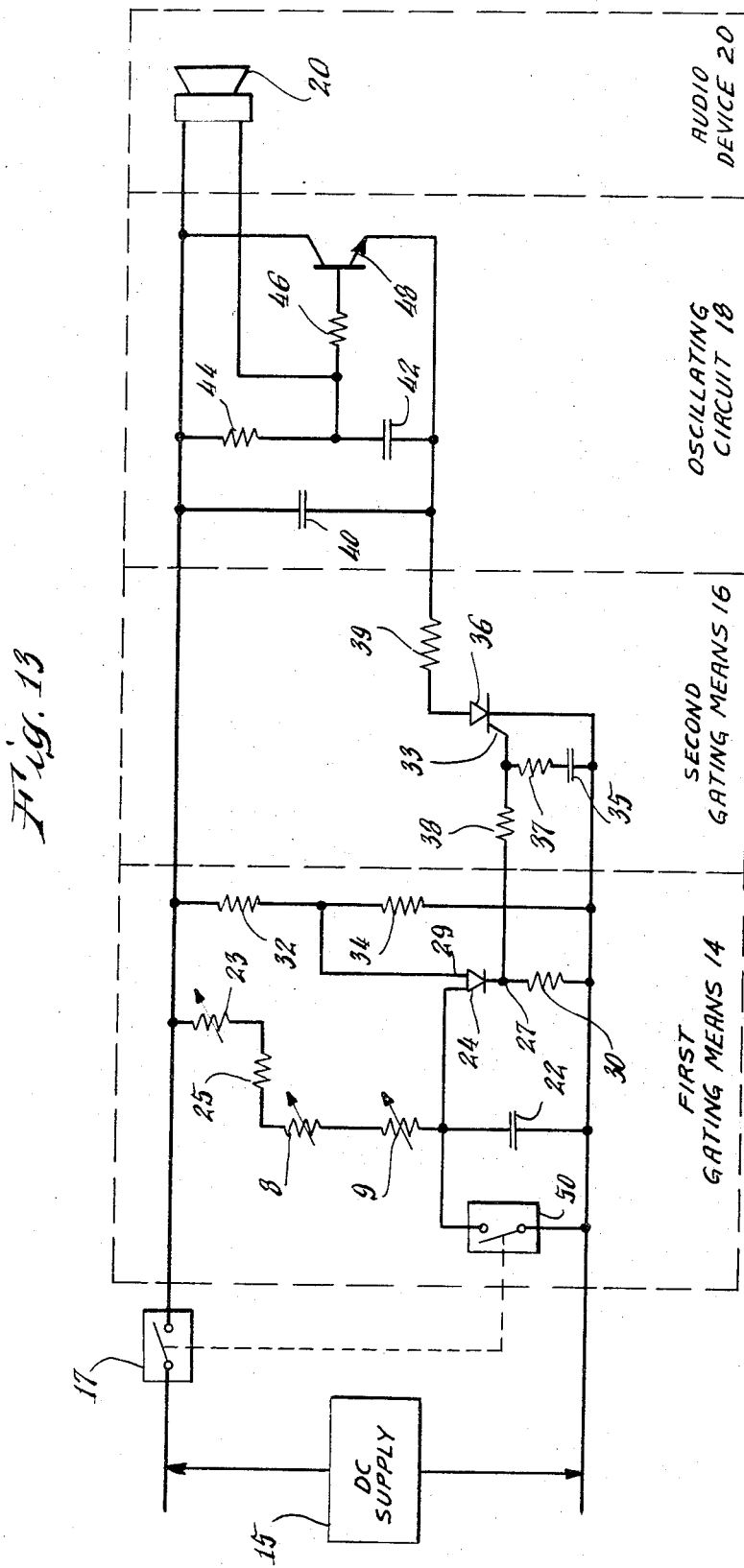

FIG. 13 is a schematic diagram showing the circuitry of our invention.

DETAILED DESCRIPTION OF THE INVENTION

FIG. 1 of the drawings is presented to show, in broad outline, the use of the invention. It illustrates an outdoor cooking unit 1 with hot coals 2, a grill 3, and steaks 4 being cooked. The timing device of our invention 5 is shown positioned over to one side on top of the unit.

FIG. 2 is a closeup perspective view of the timer substantially as it is currently being marketed. The timer includes an ON switch 7, a rotatable doneness control 8, a rotatable thickness control 9, and a small grill or opening 10 to emit the alarm signal when cooking is done. Associated with the two timing controls 8 and 9 are scales 12 and 13. Scale 12 has control positions marked on it showing the positions that control 8 should be set at for determining the degree of doneness. Scale 13 shows the position that control 9 should be set to adjust the cooking time for the thickness of the steak. The positions of the indications on controls 12 and 13 serve to control the linearity or non-linearity of the variation of times with doneness and thickness.

FIGS. 3 and 4 are exemplary of the discoveries which we made relating to cooking times. FIG. 3 is a graph showing how the cooking time for a given degree of doneness will vary as the steak increases in thickness. Going from left to right the length of time increases, and going from bottom to top the thickness of the steak increases. As can be seen, for thinner steaks the length of cooking time appears to be in direct ratio to the thickness of the meat and so is linear. However, the curve suddenly bends over to the right showing a sharp elbow, after which the cooking time increases rapidly as the thickness of the steak increases only slightly. We find that this begins to take place at about a 1 ½ inch steak. Though we do not known the actual explanation, as mentioned above, it would appear to be due to the fact that after the meat reaches a certain thickness less radiant heat is able to penetrate the meat and the central part of very thick steaks must be cooked by conducting heat from the outside.

FIG. 4 is a similar exemplary graph, this time to show how the degree of doneness varies with time. Once again time increases as one goes from left to right; doneness increases from bottom to top. Though it could well be argued that our definitions of rare, medium rare, medium and well done are different from those of other people, we have found that there is generally a directly proportionate ratio, and so the curve on the graph is a straight line. Regardless, if other people have different conceptions of the degree of doneness than we have, they could use the timer by simply setting it slightly differently than is shown on the dial itself. This would also enable them to compensate for the difference between the intensity of the heat from their fire and the distance of the meat from their fire, as contrasted with what we felt was "standard" in our work. Knowing the theoretical times and variations of them for cooking steak gave us a basis upon which we were able to invent the present timer and have it operate accurately.

FIGS. 5, 6, 7 and 8 show further results of our empirical work. Each show what we discovered to be the proper cooking times as thickness of the steak varies. We assume, in each instance, use of the same cooking heat. The figures show, respectively, times for rare, medium rare, medium, and well done cooking. The shaded area in the figures shows the variation in cooking time we experienced for various pieces of meat. The dotted lines show the actual times that our unit will provide when set for a particular thickness and degree of doneness.

It will be noted that the dotted lines all fall within the shaded areas, and so should provide satisfactory cooking times. The only exception to this is that the dotted lines tend to get outside the shaded area for the thicker steaks. This is deliberate, based on the possibility that perhaps not quite so much time as we though necessary was required for the very thick steaks. In the particular instance here, it simply represents the design criteria we applied to our scale setting indicia and could be varied, as desired, by simply adjusting the positioning of the indicia for the 2 inch steaks differently for the scales.

Similarly, FIGS. 9, 10, 11 and 12 show the variation of doneness with time for ¾ inch, 1 inch, 1 ½ inch and 2 inch steaks, respectively. Again the shading shows the empirical times we found, and the dotted lines shows the actual times provided by our timer. Once again (FIG. 12) the particular timer scale was set so the actual time for thick steaks is slightly less than the empirical time of our results.

Turning now to the actual circuit used in our preferred embodiment (FIG. 13), capacitor 22 is charged from DC supply 15 through trimming resistor 23, fixed resistor 25, variable resistor 8 and variable resistor 9. It will be noted that variable resistors 8 and 9 correspond to the doneness and thickness controls shown in FIG. 2; this is because the doneness and thickness controls are variable resistors and matched to the scales 12 and 13. Resistor 25 with trimming resistor 23, however, serves to provide a minimum base time for charging and is related to the "standard" size, fire and distance that the meat is from the fire referred to above. Thus it can be seen that the charging time of capacitor 22 is a function of the totality of resistors 23, 25, 8 and 9 and so the time to charge capacitor 22 can be controlled and predetermined.

Unijunction transistor 24 is biased by a voltage divider circuit made up of resistors 32 and 34 across the DC supply 15, with the midpoint between the resistors leading to terminal 29.

The operation of the first gating means 14 is as follows: Terminal resistor 23 is adjusted (usually in the factory) for standardized operation; variable resistor control 8 is adjusted to the degree of doneness desired; and it should be noted that the spacing of the "rare", "medium rare", "medium", and "well" settings on scale 12 of timer 5 are substantially uniformly spaced so that a linear variation and cooking time is accomplished by moving the doneness control plate. The steak thickness control 9 is set to the proper position on scale 13. It will be noted that here, by contrast, the spacing of the positions for thickness on scale 13 is not linear, i.e., the positions are not spaced proportionately to the proportionate changes in thickness, but, rather, is non-linearly spaced in accordance with the teachings shown by the empirical data of FIGS. 5 through 8. Thus, scales 12 and 13 are graduated to reflect the data we found on variations of cooking time with thickness and "doneness". This, then, serves to make our timer a mathematical model of the actual cooking process.

After the settings have been made, ON-OFF switch 17 is closed to connect first gating means 14 across the DC supply 15. It will be noted that switch 17 is a gang switch, one portion of which connects the DC supply to the first gating means circuitry and the other portion of which short circuits capacitor 22 to discharge it. The switch is so ganged that when the gating means is connected to the DC supply, the capacitor is not short circuited, and vice versa. When these first gating means are connected across the DC supply, current flows through resistors 23, 25, 8 and 9 to charge capacitor 22. At first the voltage across the charging capacitor 22 is not high enough to turn on the programmable unijunction transistor 24, and the transistor 24 is in its normally non-conducting state. While the ON-OFF switch 12 remains closed, the charge on the capacitor 22 continues building up, and, after a time interval determined by the time constant of the series circuit of resistors 23, 25, 8 and 9 and capacitor 22, the voltage across the capacitor 22 reaches a value sufficient to turn on the programmable unijunction transistor 24 to cause it to commence conducting. Resistor 30 serves as a bleeding resistor.

When the programmable unijunction transistor 24 commences conducting, the signal at its output terminal 27 is applied to the trigger terminal 33 of an SCR 36. The SCR 36 may be a Silicon Controlled Rectifier of the type of Unitrode ID 100 or Unitrode ID 200. The terminals 27 and 33 are connected by means of a voltage dropping resistor 38. The current signal at the trigger terminal 33 causes the normally closed SCR 36 to commence conducting, and the conducting state of the SCR 36 allows the oscillating circuit 18 to be driven into oscillation by the voltage from the DC supply 15. The oscillating circuit 18 is a conventional configuration of capacitors 40 and 42, resistors 44 and 46 and an NPN transistor 48.

When the circuit 18 is oscillating, the capacitor 42 discharges repetitively across the transistor 48 to make the voltage drop across the resistor 44 fluctuate at the oscillating frequency. The audio device 20 which is connected across the resistor 44 is thus caused to generate an audio signal. The audio device 20 may be a piezoelectric device such as a Clevite PXT Unimorph, or it may be another suitable device for generating an audio signal in response to an oscillating voltage input.

The audio signal is terminated by opening the ON-OFF switch 17. A bleeding switch 50 is mechanically ganged with the ON-OFF switch 12 to be in a complementary state therewith, i.e., to be open when the ON-OFF switch 12 closes, and to close when the ON-OFF switch 12 is open so as to discharge the capacitor 22. The SCR 36 is protected against firing by surges, occurring when switch 50 is closed, by series capacitor 35 and resistor 37 leading from the SCR gate to Ground.

In operation of the timing circuit of FIG. 13, and after the desired time interval has been selected by controls 8 and 9, the selected interval commences with the closing of the ON-OFF switch 12. When the charge on the capacitor 22 reaches a predetermined value, determined by the bias on terminal 29 of programmable unijunction transistor 24 by means of the voltage divider made up by resistors 32 and 34 across DC supply 15, the programmed unijunction transistor 24 commences conducting and turns on the SCR 36. When the SCR 36 commences conducting, the oscillating circuit 18 begins oscillating and drives the audio device 20 to generate an audible signal to indicate that the predetermined time interval has elapsed. This means that one side of the steak is done. The steak is then turned over and the process repeated. Desired time intervals for this mean time may be chosen by suitably choosing and setting the appropriate components of the FIG. 13 circuit. We have found that the following components provide appropriate timing to correspond with the desired empirical times:

| Resistors | | Transistors | |
|---|---|---|---|
| 25 | 580K ohm | 24 | U13TI Unijunction |
| 30 | 1K ohm | 36 | 1D100 SCR |
| 32 | 22K ohm | 48 | 2N2222 |
| 34 | 27K ohm | | |
| 37 | 10K ohm | Capacitors | |
| 38 | 10K ohm | | |
| 39 | 1.5K ohm | 22 | 150 mfd |
| 44 | 47K ohm | 35 | 0.01 mfg |
| 46 | 1K ohm | 40 | 42 – 0.2 mfd |
| Controls | | Audio Device | |
| 8 & 9 | 2.5 megohm | 20 | P/N 60708 Unimorph |
| 23 | 250K ohm trimmer | | |

What is claimed:

1. A timing alarm adapted to be used for over-the-grill cooking of meats such as steaks, where the quantity of coals or other heat source and the distance there from the meat is substantially constant from one cooking time to another, but the thickness of said meat and the desired doneness may vary, including
   a circuit with a first gating section and a serially related alarm section, said alarm section being controlled by said first gating section,
   a power supply therefor,
   said first gating section including a timing circuit actuating the gate thereof,
   said timing circuit including an RC circuit having at least one fixed resistor to provide a base time and a plurality of variable resistors to provide variable times,
   a scale associated with each said variable resistor and calibrated in accordance with an empirically determined cooking time variable, and
   an ON switch between said power supply and said first gating means for starting said timing cycle,
   whereby said timing circuit may be adjusted for a proper timing alarm for each type of meat cooked.

2. A timing alarm as set forth in claim 1 in which one of said variable resistors is to set the timing for the degree of doneness desired and said associated scale is substantially linear, and another of said variable resistors is to set timing for the thickness of the meat being cooked and said associated scale is non-linear.

3. A timing alarm as set forth in claim 1 in which the gate means in said first gating section is a programmable unijunction transistor and there is a second gating section between said first gating section and said alarm section having an SCR gate.

4. A timing alarm as set forth in claim 1 including means ganged with said ON switch for discharging said capacitor when said ON switch is open.

5. A steak-cooking alarm timer having therein parameters related to the linear and non-linear variables such as those occurring due to steak thickness and desired degree of doneness, and having circuitry adapted to adjust timing accordingly, said timer including
   an alarm,
   a control circuit for actuating said alarm capable of providing varying cooking times,
   a power supply for said control circuit,
   said control circuit including a timing circuit adapted to provide a fixed base time period and an additional variable time period prior to actuating said alarm,
   a plurality of controls for said variable time period portion of said timing circuit corresponding to said variable in steak-cooking time and corresponding to said parameters, at least one of said controls varying on a nonlinear basis,
   whereby said alarm time will vary in accordance with required cooking time.

6. A steak-cooking alarm timer as set forth in claim 5 and having scales associated with said controls, said scales being marked to accord with the desired respective said parameters.

7. A steak-cooking alarm timer as set forth in claim 6 in which said controls are variable resistors in an RC circuit, and said scales are marked corresponding to required cooking times for steak thickness and degree of doneness.

* * * * *